United States Patent [19]

Vanderkooi et al.

[11] 4,177,210

[45] Dec. 4, 1979

[54] HYDRATION OF ACRYLONITRILE TO ACRYLAMIDE

[75] Inventors: William N. Vanderkooi; Gary L. Jewett, both of Midland, Mich.

[73] Assignee: The Dow Chemical Company, Midland, Mich.

[21] Appl. No.: 922,133

[22] Filed: Jul. 5, 1978

[51] Int. Cl.$^2$ ............................................. C07C 102/08
[52] U.S. Cl. ................................. 260/561 N; 548/235
[58] Field of Search ......................... 260/561 N, 307 R

[56] References Cited

U.S. PATENT DOCUMENTS

| | | | |
|---|---|---|---|
| 2,865,960 | 12/1958 | Shearer, Jr. et al. | 260/561 N |
| 3,130,229 | 4/1964 | Friedrich et al. | 260/561 N |
| 3,524,875 | 8/1970 | Hadley et al. | 260/307 R X |
| 3,541,131 | 11/1970 | Darcas et al. | 260/307 R X |
| 3,686,307 | 8/1972 | Greene et al. | 260/561 N |
| 3,766,088 | 10/1973 | Yoshimura et al. | 260/561 N X |
| 3,767,706 | 10/1973 | Habermann et al. | 260/561 N |
| 3,789,074 | 1/1974 | Seale et al. | 260/561 N |

*Primary Examiner*—Arthur P. Demers
*Attorney, Agent, or Firm*—D. H. Fifield

[57] ABSTRACT

An improved process for the hydration of acrylonitrile to acrylamide where nitrile and water are contacted with a heterogeneous hydration catalyst and the process is improved by utilizing as feed acrylonitrile and water which are substantially free of oxazole. Acrylamide monomer of enhanced stability against premature polymerization is obtained.

16 Claims, No Drawings

HYDRATION OF ACRYLONITRILE TO ACRYLAMIDE

BACKGROUND OF THE INVENTION

The invention relates to an improved process for hydration of acrylonitrile to acrylamide where oxazole is excluded from the reactant feed streams, acrylonitrile and water. The acrylamide produced in this improved hydration process exhibits exceptionally improved stability and low content of soluble and insoluble polymeric impurities without need for posthydration treatment such as that described in U.S. Pat. No. 3,923,741 or Japanese Pat. Nos. Kokais 113,913 (1977); 116,410 (1977); 83,323 (1975); and 82011 (1975). Acrylamide polymers prepared by the polymerization of acrylamide monomer from the improved process exhibit higher viscosity in aqueous solution than polymers prepared from acrylamide produced from acrylonitrile containing substantial oxazole.

The removal of oxazole from acrylonitrile is taught in U.S. Pat. Nos. 3,541,687 and 3,574,687 by contacting the acrylonitrile with a water-moist cation exchange resin in the hydrogen form. Regeneration is accomplished with deionized water or steam. It is suggested in U.K. Pat. No. 1,131,134 that oxazole may be removed from acrylonitrile by hydroextractive distillation. It has also been taught in U.S. Pat. No. 3,146,258 and other patents that methylvinyl ketone impurity is removed from acrylonitrile by contacting with a strong acid cation exchange resin in its hydrogen form previously treated with a lower alkanol. In U.S. Pat. No. 2,444,589 an ion exchange material in conjunction with a decolorizing agent such as charcoal is utilized to purify acrylonitrile. The resultant purified acrylonitrile may be utilized in the preparation of acrylonitrile polymers to avoid discoloration of the ultimate product and therefore enhance the desirability of fibers or other colorless plastic articles prepared from such polymers. Acrylonitrile supplied commercially for heterogeneous catalytic production of acrylamide has commonly contained about 200 to 300 ppm (by weight) of oxazole, based on acrylonitrile.

SUMMARY OF THE INVENTION

In a process for hydration of acrylonitrile to acrylamide comprising contacting acrylonitrile with water at a temperature between about 50° C. and about 175° C. in the presence of a heterogeneous nitrile hydration catalyst, the improvement wherein the acrylonitrile and water are substantially free of oxazole, whereby the acrylamide produced exhibits enhanced stability against premature polymerization. Preferably the total oxazole content of the acrylonitrile and water is initially less than about 100 ppm based on the weight of acrylonitrile, more preferably initially less than about 50 ppm and most preferably less than about 25 ppm. The process is preferably carried out at a temperature above 75° C., more preferably above 90° C. and is preferably carried out at a temperature below 150° C. and more preferably below 135° C. The catalyst is preferably a metallic copper-based catalyst, more preferably a reduced copper catalyst or a Raney copper catalyst. Preferably the catalyst has a surface area greater than 0.2 square meters per gram. More preferably a catalyst having a surface area of at least 0.5 square meters per gram and most preferably greater than 5 square meters per gram is desired.

DETAILED DESCRIPTION OF THE INVENTION

Heterogeneous catalytic processes for the hydration of nitriles to amides, specifically acrylonitrile to acrylamide, in the presence of various metallic catalysts have been widely described in the art. For example, Japanese Pat. No. Kokai 83,323 (1975) lists catalysts based on metals such as copper, silver, zinc, cadmium, mercury, barium, galium, indium, thallium, tin, lead, tellurium, chromium, molybdenum, tungsten, iron, cobalt, nickel, ruthenium, rhodium, platinum, lanthinium, cerium, thorium and the like in the form of metal, metal oxides, metal salts or compounds bonded to other metals. Numerous other heterogeneous metal catalysts are also taught in the art, for example, U.S. Pat. Nos. 3,597,481; 3,631,104; 3,758,578; 3,696,152; 3,366,639; and 4,036,879.

Of these catalysts, catalysts comprising metallic copper exhibit the best performance in terms of conversion, selectivity and activity for the hydration of acrylonitrile to acrylamide. Numerous copper-based catalysts are known in the art and include Raney copper, Ulmann copper precipitated by reducing a soluble copper salt with metallic zinc, and other reduced copper species prepared by reduction of various copper oxides or salts with any common reducing agent. The added presence of other metals or metal compounds is an acceptable variation. Metallic copper prepared by decomposing copper hydride is also suitable. The catalysts may be impregnated on various inert carriers or supports that are also described in the literature. Preferred for use in the invention are reduced copper catalysts prepared by reduction of mixtures of about 10 to 99 weight percent copper oxide or other copper compounds and 1 to 90 weight percent chromium oxide, zinc oxide, aluminum oxide, cobalt oxide, molybdenum oxide or iron oxide.

After preparation of the active metallic catalysts, it is preferred to protect the catalyst from contact with oxygen. This generally entails blanketing the activated catalyst with an inert atmosphere such as nitrogen or argon after activation, e.g., reduction or precipitation, and by excluding oxygen from the acrylonitrile and water feed streams to the reaction process.

The hydration process is carried out by contacting the acrylonitrile and water, in varying proportions, with one another in the presence of the heterogeneous hydration catalyst. The process can be carried out in either a batch or continuous manner but since the catalysts are essentially insoluble, heterogeneous catalysts, a continuous reaction is preferred. At higher temperature, the gaseous reactants are miscible in all proportions but for liquid reactants, sufficient contact of acrylonitrile and water should be maintained by dissolving one in the other. Outside of the limits of the solubility of one of the reactants in the other, the reactant mixture may be agitated and a suitable solvent, for example acrylamide, may be added. Excess water is a useful solvent since the product is commonly marketed as an aqueous solution.

The catalyst, as previously mentioned, may be immobilized on an inert support or pelletized, if it is one of the less maleable catalysts, with suitable inert binders. In the case of a highly maleable catalyst such as Raney copper or copper powder, a countercurrent flow process where the catalyst is employed as an aqueous slurry or suspension may be used. However, because of the simplicity of operation, a fixed bed catalyst process is preferred. The product is ultimately recovered and separated from any unreacted acrylonitrile by steam stripping or vacuum distillation and concentrated if desired.

The temperature of the reaction may vary from about 50° C. up to about 175° C. Preferably the reaction is maintained above about 75° C., more preferably above about 90° C. and preferably below about 150° C., more preferably below about 135° C.

The oxazole impurity in the acrylonitrile commonly available commercially is removed by contacting the acrylonitrile feed, preferably dried acrylonitrile, with a cation exchange resin in the acid form. It is preferable that the resin first be dried by heating or by passing a dry inert gas through the resin prior to contact with acrylonitrile. After breakthrough of oxazole is observed, the cation exchange resin is regenerated by contacting with water, hot water, steam, methanol or slightly acid aqueous solutions. The cation exchange resin to be used is suitably any commercial poly (vinylaromatic sulfonic acid) resin in the hydrogen form. Either a gel or macroporous type resin may be employed. Preferably the cation exchange resin is loaded in a column and the acrylonitrile to be purified is passed through this column. The removal of oxazole may be accomplished at a temperature between about 0° C. and 100° C., preferably at ambient temperature.

The presence of oxazole may be determined by employing a gas chromatograph analytical apparatus. Oxazole in the purified acrylonitrile is preferably reduced to less than 100 ppm based on the weight of acrylonitrile, more preferably less than 50 ppm and most preferably less than about 25 ppm. By the term "substantially free of oxazole" we mean a water/acrylonitrile feed stream containing less than about 200 ppm oxazole based on the weight of acrylonitrile.

SPECIFIC EMBODIMENTS

In the following examples, various metallic catalysts are employed for the hydration of acrylonitrile to acrylamide and the quantity of oxazole in the acrylonitrile feed is varied. The hydration reaction is carried out both as a continuous process and as a batch process.

In the batch process, the reaction is carried out in a stirred, 1000 cc Parr pressure vessel reactor. The charge is about 50 g acrylonitrile, 325 g water and 25 g catalyst. The catalyst, if available in pellet form, is crushed to about 20-60 mesh (U.S. Sieve), reduced and then added to the Parr vessel in a nitrogen-filled chamber to avoid air contact. In most instances, air is purged from the water and acrylonitrile feed also. The Parr vessel reaction is run for about one hour at about 110°-120° C. Catalysts for the batch reactions are reduced (except Raney copper) at about 175° C. for about six hours with about 2000 cc/min of a 20/80 (vol) hydrogen/nitrogen stream and maintained under nitrogen after reduction.

In the continuous process, a series of three or four 150 cc adiabatic reactors, each filled with catalyst, is employed. The catalyst is reduced in situ at about 175° C. to 225° C. for about 20-30 hours with about 7000 cc/min of about 5/95 (vol) hydrogen/nitrogen stream and maintained under nitrogen after reduction. Deoxygenated water is fed to the first reactor of the series at a rate of about 500-600 cc/hr mixed with about 95-120 cc/hr of deoxygenated acrylonitrile. To the effluent stream from the first reactor, about 100-135 cc/hr deoxygenated acrylonitrile is added to enrich the feed to the second reactor. The metallic copper in the first reactor also scavenges any oxygen remaining in the feed and since the copper so oxidized is dissolved by acrylamide, acrylamide should not be added or recycled to the first reactor. The reactor series is run at a temperature between about 95° C. and 130° C. with a back pressure of about 8 to 9 atmospheres.

The product from the reaction is collected and vacuum distilled to remove acrylonitrile and water until the concentration of acrylamide in water is about 50 percent by weight. Cupric sulfate is added to give a copper (II) concentration of about 22 ppm, based on acrylamide, and air is sparged to saturate the solution. A sample of this concentrated acrylamide solution is placed in a commercial gel meter, a Sunshine Gel Time Meter No. 22 with a 4 mil wire substituted for the standard 10 mil wire, to measure the time that it takes for the solution to reach a predetermined solution viscosity at 90° C. This gives the relative polymerization stability for a sample of acrylamide monomer solution. The gel time test is carried out while bubbling nitrogen through the acrylamide solution in the gel meter to remove dissolved oxygen and to exclude diffusing oxygen thus breaking down the copper (II)-oxygen inhibitor system and no polymerization initiators are added. The greater the gel time, the greater the stability of the acrylamide.

The various metallic catalysts to be employed are designated:

Catalyst A—a copper-based catalyst containing about 30-35 percent by weight copper combined in copper compounds in a magnesium silicate matrix, which is prepared in the fashion of U.S. Pat. No. 3,928,439 by reacting an aqueous solution of 128 g magnesium nitrate (6H$_2$O) and 179 g sodium silicate (12H$_2$O) to precipitate magnesium silicate, adding thereto an aqueous solution containing 141 g cupric nitrate (3H$_2$O) and 6.3 g chromium (III) nitrate (9H$_2$O) then precipitating copper and chromium carbonates on the magnesium silicate by adding an aqueous solution of 78 g sodium carbonate, washing the ultimate precipitate, pressing pellets from it and then drying at about 60° C;

Catalyst B—a commercial copper-chromite catalyst sold under the tradename Harshaw Cu 0203 T catalyst, which contains about 80 percent by weight cupric oxide and about 17 percent chromium oxide, in pellet form;

Catalyst C—a copper-chromium catalyst which is prepared in the fashion of Examples 3-16 of U.S. Pat. No. 3,696,152 except that about 0.96 mole cupric nitrate and about 0.04 mole chromium (III) nitrate is employed, the resulting carbonates precipitated at about 20° C. are pelleted then decomposed at about 250° C. for about one hour;

Catalyst D—a copper-chromium catalyst which is prepared in the manner of Catalyst C except that a 0.98/0.02 mole ratio of the copper compound/chromium compound is employed, the resulting carbonates precipitated about 10°-15° C., the pellets decomposed at about 250°-300° C. and thereafter annealed in nitrogen for about 6 hours at about 300°-325° C.;

Catalyst E—a 0.96/0.04 mole ratio copper-chromium catalyst prepared in the manner of Catalyst D;

Catalyst F—a copper-zinc catalyst of 0.96/0.04 mole ratio prepared in the manner of Catalyst E; and Catalyst G—a commercial catalyst sold by W. R. Grace Co. under the tradename Raney copper No. 29, essentially 100 percent metallic copper.

The acrylonitrile feed, having reduced oxazole content, is prepared by passing it through a column loaded with a commercial sulfonated polystyrene resin, DOWEX MSC-1 cation exchange resin, in the acid form which has been dried prior to use. Acrylonitrile so treated contains less than the lower limit (about 20 ppm) of oxazole detectable by use of a gas chromatograph packed with Chromosorb 101 chromatographic packing impregnated with 1.5 weight percent dodecyl benzene sulfonic acid. Acrylonitrile so purified is mixed with a suitable quantity of untreated acrylonitrile to obtain feed with varying amounts of oxazole.

BATCH PROCESS

Example 1—Supported Copper-Chromium Catalyst

A. In the Parr vessel reactor, as previously described, acrylonitrile containing about 300 ppm oxazole (based on acrylonitrile weight) is hydrated over Catalyst A which has been reduced as previously described, and the acrylamide produced is concentrated to about 49 percent and is measured for gel time. A gel time of about 70 minutes is exhibited by the acrylamide.

B. In the same manner, acrylonitrile containing less than about 20 ppm oxazole is hydrated and the resulting acrylamide exhibits a gel time of about 260 minutes.

EXAMPLE 2—Copper-Chromium 80/17 Catalyst

A. In like manner Catalyst B, reduced as previously described, is employed in the hydration of acrylonitrile containing about 30–40 ppm oxazole. Acrylamide produced from such hydration exhibits a gel time of about 90 minutes.

B. In the same manner, acrylonitrile containing less than about 20 ppm oxazole is hydrated and the resulting acrylamide exhibits a gel time of about 150 minutes.

Example 3—Copper-Chromium 96/4 Catalyst

A. Catalyst C, reduced as previously described, is employed to hydrate acrylonitrile containing about 300 ppm oxazole. The acrylamide produced exhibits about a 70 minute gel time.

B. In the same manner, acrylonitrile containing less than about 20 ppm oxazole is hydrated. The acrylamide produced exhibits a gel time of about 120 minutes.

Example 4—Raney Copper Catalyst

A. Catalyst G is employed to hydrate acrylonitrile containing about 300 ppm oxazole. The resulting acrylamide exhibits a gel time of about 100 minutes.

B. In the same manner, acrylonitrile containing less than about 20 ppm is hydrated and the resulting acrylamide exhibits about a 200 minute gel time.

CONTINUOUS PROCESS

Example 5—Copper-Chromium 96/4 Catalyst

A. In the three-reactor series described above filled with Catalyst E which has been reduced as previously described, a feed of about 509 cc/hr water and 107 cc/hr acrylonitrile is pumped to the first reactor. To the effluent stream from the first reactor is added about 118 cc/hr acrylonitrile. The acrylonitrile employed in both cases contains about 300 ppm oxazole. The product from the three-reactor series is distilled and concentrated to about 47.5 percent aqueous acrylamide. The acrylamide exhibits a gel time of about 90 minutes.

B. The hydration of A is repeated with acrylonitrile containing about 50 ppm oxazole. Such acrylonitrile is prepared by treating with a commercial cation exchange resin then blending with untreated acrylonitrile to attain the 50 ppm oxazole content. The resulting aqueous acrylamide product, concentrated to about 51 percent strength, exhibits a gel time of about 180 minutes.

C. In the same manner, acrylonitrile containing less than about 20 ppm oxazole is hydrated, the aqueous product distilled and concentrated to about 49 percent acrylamide. The acrylamide exhibits about a 1080 minute gel time.

D. In the same manner a commercial acrylonitrile, containing less than about 20 ppm oxazole and designated for preparation of low color acrylonitrile polymers, is hydrated. Distilled and concentrated to 50 percent acrylamide, a gel time of about 830 minutes is exhibited.

E. To the acrylonitrile of D, oxazole is added until the acrylonitrile contains about 450 ppm oxazole. In the manner above, the acrylonitrile is hydrated, distilled and concentrated to 48 percent acrylamide. The acrylamide exhibits a gel time of about 50 minutes. The effect of decreasing oxazole content is readily observed in the following Table.

TABLE

Effect of Oxazole Content of Feed

| Example | Oxazole (ppm based on Acrylonitrile) | Gel Time of Acrylamide Product (min) |
|---|---|---|
| 5E | 450 | 50 |
| 5A | 300 | 90 |
| 5B | 50 | 180 |
| 5C | <20 | 1080 |
| 5D | <20 | 830 |

Example 6—Mixed Catalyst

The three-reactor series of Example 5 is modified by addition of an identical fourth reactor. The first two reactors of the series are loaded with Catalyst E and the last two reactors are loaded with Catalyst F. All catalyst is reduced as previously described. Acrylonitrile containing about 25 ppm oxazole is fed to the first reactor and second reactor, as in Example 5, for the hydration reaction. The product is distilled and concentrated to 48.5 percent acrylamide. The acrylamide exhibits a gel time of about 260 minutes.

Example 7—Copper-Zinc Catalyst

A. All four reactors of Example 6 are filled with Catalyst F which is reduced. Acrylonitrile containing about 300 ppm is fed as in Example 6. The concentrated 49 percent acrylamide product exhibits about a 50 minute gel time.

B. In the same manner, acrylonitrile containing less than about 20 ppm oxazole is hydrated. The concentrated 50.5 percent acrylamide product exhibits a gel time of about 150 minutes.

Example 8—Copper-Chromium 98/2 Catalyst

In the manner of Example 5, the three-reactor series is loaded with Catalyst D which is reduced as previously described. As in Example 5, acrylonitrile containing about 300 ppm oxazole is hydrated as is acrylonitrile containing less than about 20 ppm oxazole. The acrylamide derived from the latter exhibits a significantly improved gel time over the former, as in the previous examples.

Example 9—Copper-Chromium 80/17 Catalyst

A. In the manner of Example 6, the four-reactor series is loaded with Catalyst B which is then reduced as previously described. Acrylonitrile containing 30–40 ppm oxazole is fed to the first reactor, and to the effluent from the first and second reactors as well, in the amounts of about 55 cc/hr, 81 cc/hr and 123 cc/hr, respectively. Water is fed to the first reactor at about 275 cc/hr. The concentrated acrylamide product from the reactor series exhibits a gel time of about 700 minutes.

B. In the same manner, acrylonitrile containing less than about 20 ppm oxazole is hydrated. The concentrated acrylamide product exhibits a gel time of about 1200 minutes.

Example 10—Polymer Improvement

Samples of acrylamide prepared in the fashion described above from acrylonitrile containing (a) about 30–40 ppm oxazole and (b) less than about 20 ppm oxazole, are polymerized as dilute aqueous solutions using redox initiator systems. Standard viscosity tests of the resultant polymers determine that about 35 percent higher viscosity is present in polymers of the acrylamide derived from low oxazole acrylonitrile, (b), compared to polymers of the acrylamide derived from the higher oxazole acrylonitrile, (a).

What is claimed is:

1. In a process for hydration of acrylonitrile to acrylamide comprising contacting acrylonitrile with water at a temperature between about 50° C. and about 175° C. in the presence of a heterogeneous nitrile hydration catalyst, the improvement wherein the acrylonitrile and water are substantially free of oxazole.

2. The process of claim 1 wherein the temperature is between about 75° C. and about 150° C.

3. The process of claim 1 wherein the catalyst comprises copper metal and has a surface area of about 0.2 $m^2/g$ or greater.

4. The process of claim 1 wherein the catalyst comprises reduced copper.

5. The process of claim 1 wherein the catalyst comprises reduced copper or Raney copper.

6. The process of claim 1 or 5 wherein the total oxazole content of the acrylonitrile and water is initially less than about 100 ppm based on the weight of acrylonitrile.

7. The process of claim 1 wherein the total oxazole content of the acrylonitrile and water is initially less than about 50 ppm based on the weight of acrylonitrile.

8. The process of claim 7 wherein the total oxazole content is initially less than about 25 ppm.

9. The process of claim 7 wherein the catalyst comprises reduced copper or Raney copper.

10. The process of claim 9 wherein the temperature is between about 75° C. and about 150° C.

11. The process of claim 1 wherein the acrylonitrile, prior to contact with the catalyst, has been contacted with a cation exchange resin in the acid form to remove all oxazole in excess of 100 ppm based on the weight of acrylonitrile.

12. The process of claim 1 wherein the catalyst comprises copper metal having a surface area of greater than about 0.5 $m^2/g$ and is protected from contact with oxygen during the hydration process.

13. The process of claim 12 wherein the total oxazole content of the acrylonitrile and water is initially less than about 50 ppm based on the weight of acrylonitrile.

14. An improved process for the production of acrylamide polymers comprising polymerization of acrylamide produced by the hydration process of claim 1.

15. The process of claim 14 wherein the hydration catalyst comprises reduced copper or Raney copper and is protected from contact with oxygen during the hydration process.

16. The process of claim 15 wherein the total oxazole content of the acrylonitrile and water in the hydration process is initially less than about 50 ppm based on the weight of acrylonitrile.

* * * * *